Figure 1:
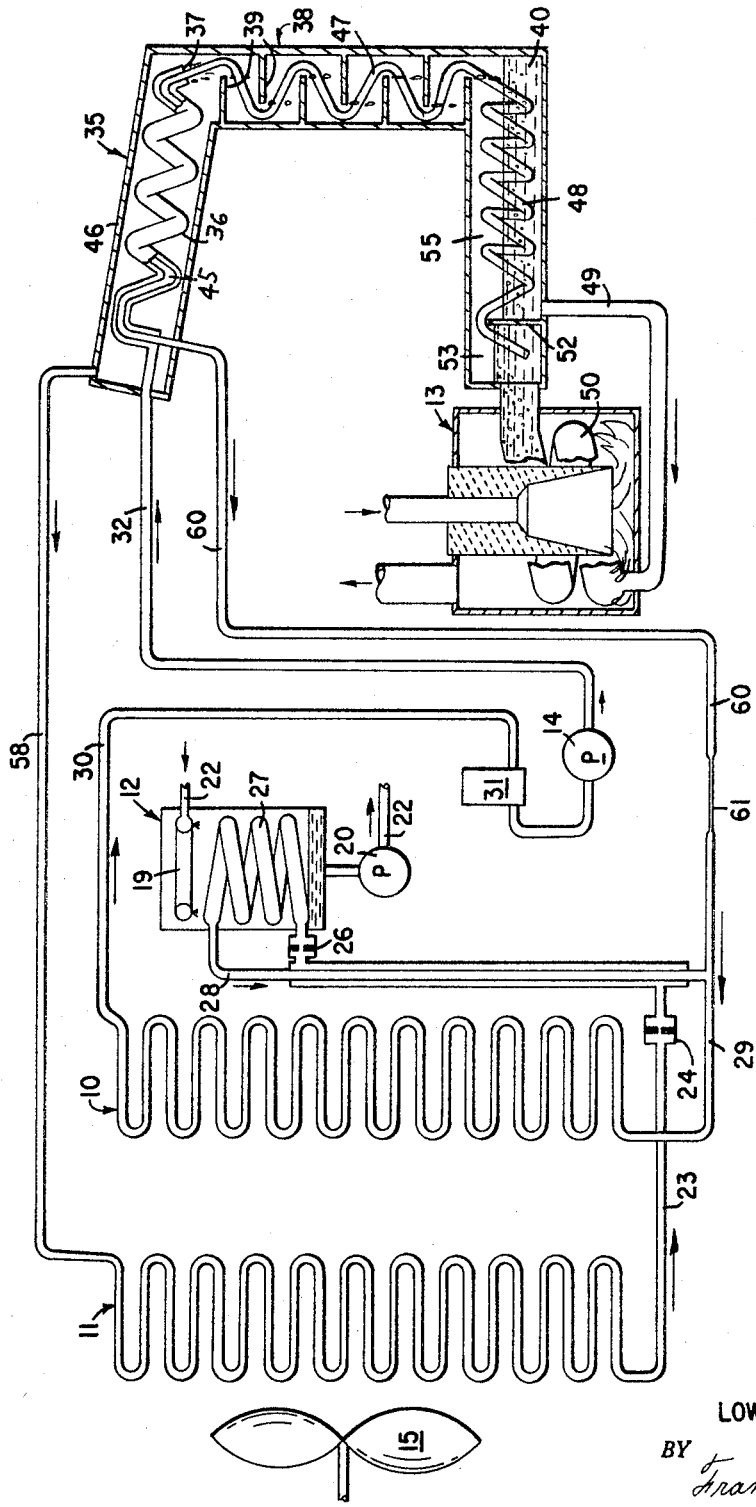

Sept. 6, 1966 L. A. McNEELY 3,270,522
ABSORPTION REFRIGERATION
Filed March 30, 1965 2 Sheets-Sheet 1

INVENTOR.
LOWELL A. MCNEELY.
BY Frank N. Decker Jr.
ATTORNEY.

Sept. 6, 1966 L. A. McNEELY 3,270,522
ABSORPTION REFRIGERATION

Filed March 30, 1965 2 Sheets-Sheet 2

INVENTOR.
LOWELL A. MCNEELY.
BY
Frank N. Decker Jr.
ATTORNEY.

United States Patent Office 3,270,522
Patented Sept. 6, 1966

3,270,522
ABSORPTION REFRIGERATION
Lowell A. McNeely, Indianapolis, Ind., assignor to Carrier Corporation, Syracuse, N.Y., a corporation of Delaware
Filed Mar. 30, 1965, Ser. No. 443,804
2 Claims. (Cl. 62—476)

This invention relates to absorption refrigeration and, more particularly, to absorption refrigeration systems of the type which employ a solution heat exchanger and a rectifier in the solution circuit.

In prior absorption refrigeration systems, particularly of the type which employ ammonia as a refrigerant and water as an absorber, it is common practice to employ a rectifier for enriching the refrigerant content of vapor passing from the generator to the condenser. It is also usual practice to employ a solution heat exchange for exchanging heat between weak absorbent solution passing from the absorber to the generator and strong absorbent solution passing from the generator back to the absorber. The use of these two separate components in an absorption refrigeration system leads to efficient cycle performance by conserving the energy input to the system.

In the past various systems have been proposed for splitting weak solution flow between the rectifier and the heat exchanger to obtain high thermodynamic efficiency. These systems are satisfactory in operation but have sometimes resulted in requiring greater than desirable heat transfer surface in the machine. Obviously, it is desirable to minimize the amount of heat transfer surface in order to keep manufacturing costs at a minimum. In addition, prior systems involving splitting of solution flows have tended to be complex from a manufacturing point of view because of the necessity of introducing extra solution lines, with their attendant welded connections, all of which have an adverse effect on the cost of the machine. Because of the manufacturing complexities introduced it has not always been desirable to attempt to achieve optimum cycle efficiency, particularly in the case of relatively small size absorption refrigeration machines intended for residential use where initial cost is an important factor in their commercial acceptability.

Accordingly, it is a principal object of this invention to provide an improved absorption refrigeration system and method of operating the same.

It is a further object of this invention to provide an improved absorption refrigeration system and method of operating the same which provides high thermodynamic efficiency while at the same time requiring a minimum of heat transfer surface, and which is simple and inexpensive to manufacture.

These and other objects of this invention are achieved, in accordance with this invention, in an absorption refrigeration system having an absorber for absorbing refrigerant vapor, an evaporator for evaporating refrigerant and for providing a cooling effect, a generator for concentrating weak absorbent solution by vaporizing refrigerant therefrom, a condenser for condensing refrigerant vaporized in said generator, and a combined rectifier and solution heat exchanger.

In the illustrated embodiments of this invention there is provided a rectifier comprising a shell member forming a passage for vapor from the generator to the condenser. A first heat exchange coil for passing strong solution from the generator to the absorber is disposed within the rectifier shell. A second heat exchanger coil for passing weak solution from the absorber to the generator is also disposed within the rectifier shell in such a manner that the weak solution passes through the rectifier and heat exchanger in simultaneous heat transfer relation with the vapor passing to the condenser and the strong solution passing to the absorber. Preferably, the two heat exchange coils are formed concentrically with each other with the outer heat exchange coil in spaced relation with the inner heat exchange coil so as to form an annular passage between the coils for the weak solution.

The arrangement of this invention has the advantage that the weak solution is employed to serve both the function of enriching the refrigerant content of vapor in the analyzer and the function of cooling the strong solution passing to the absorber without requiring any means for splitting the flow of solution in the system. Thus, the entire quantity of weak solution passes through both the analyzer and the solution heat exchanger simultaneously in countercurrent flow relation with the entire quantity of both the strong solution and the vapor, which flow concurrently with each other. This system provides a thermodynamically highly efficient refrigeration cycle while at the same time requiring a minimum of heat transfer surface and piping or welded connections. Consequently, cycle efficiency is improved by the practice of this invention while at the same time the manufacturing costs are minimized.

Figure 2:
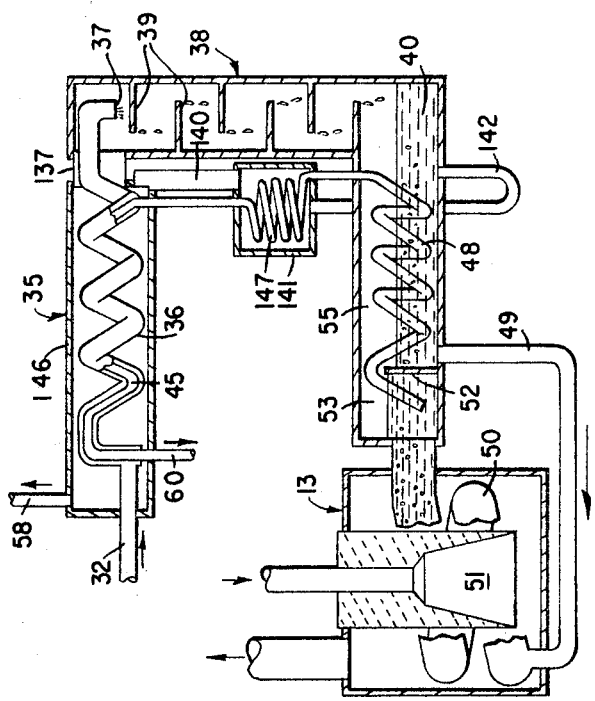

Other features and objects of this invention will become more readily apparent by referring to the following specification and attached drawing wherein:

FIGURE 1 is a schematic flow diagram of an absorption refrigeration system embodying this invention; and FIGURE 2 is a fragmentary, cross-sectional, schematic view of a portion of a modified absorption refrigeration system embodying this invention.

Referring particularly to FIGURE 1, there is shown an absorption refrigeration system having an absorber 10, a condenser 11, an evaporator 12, and a generator 13 connected to provide refrigeration. A pump 14 is employed to circulate weak absorbent solution from absorber 10 to generator 13. As used herein, the term "weak absorbent solution" refers to a solution which is weak in absorbing power, and the term "strong absorbent solution" refers to a solution which is strong in absorbing power. A suitable absorbent solution for use in the system described is water, and a suitable refrigerant is ammonia. For convenience, the absorbent liquid will be referred to as an "absorbent solution" although it will be appreciated that pure water is not technically a solution.

A chilled water pump 20 is provided for forwarding water, or other heat exchange medium chilled in evaporator 12, through chilled water line 21 to a suitable remote location for chilling a refrigeration load. The water is then returned through chilled water line 22 to a spray header 19 from which it is distributed over the exterior of evaporator coil 27.

Liquid refrigerant is passed from condenser 11 through liquid line 23, refrigerant restriction 24, the exterior passage of liquid suction heat exchanger 25 and second refrigerant restriction 26, to evaporator coil 27 of evaporator 12. Heat from the water to be chilled, passing over the exterior of evaporator coil 27, is given up to the refrigerant which vaporizes in the interior of the evaporator coil. The refrigerant vapor passes from coil 27 through vapor line 28, the interior passage of liquid suction heat exchanger 25, to mixing line 29 where it is mixed with strong solution returning to the absorber from the generator.

The mixture of refrigerant vapor and strong solution passes through mixing line 29 into the heat exchange coil which forms absorber 10. Air is passed over the exterior of the absorber coil by fan 15 to cool absorbent solution therein and increase its absorbing power. The absorbent solution is weakened as it absorbs refrigerant vapor during its passage through the absorber. By the time the absorbent solution reaches the discharge end of the absorbent coil, the refrigerant vapor is completely absorbed in the absorbent solution and the solution has become weak in absorbing power by the absorption of the vapor.

The weak absorbent solution passes through weak solution line 30 to a purge tank 31 where noncondensible gases are collected and withdrawn from the system. The weak solution is then forwarded by solution pump 14 through weak solution line 32 to combined rectifier and heat exchanger section 35.

Rectifier and heat exchanger section 35, in the preferred embodiment of this invention, comprises an outer shell 46 forming a vapor passage. Shell 46 contains an inner heat exchanger 45 and a concentric outer heat exchanger 36, as shown in the drawing. Preferably, heat exchangers 45 and 36 are spirally disposed along the inner wall of shell 46. Heat exchanger 36 may be provided with suitable fins for enhancing heat transfer. Heat exchangers 45 and 36 may take various shapes and forms within the scope of this invention. It is preferred that the heat exchangers comprise passages or coils 36 and 45 formed in a helical shape with the major diameter of the helix being slightly less than the inner diameter of shell 46 as shown in the drawing.

The inner diameter of the heat exchange tube or coil which forms heat exchanger 36 is greater than the outer diameter of the heat exchange tube or coil which forms heat exchanger 45 so as to provide an annular space for the passage of weak solution from absorber 10 to the generator 13. It will be seen that shell 46 of rectifier 35 forms a first passage for vapor passing from the generator to the condenser, the annular space between coils 45 and 36 forms a second passage through the rectifier 35 for weak solution passing from the absorber to the generator, and inner coil 45 forms a third passage for strong solution passing from the generator to the absorber. The weak solution is therefore in heat exchange relation with both the strong solution passing to the generator and vapor passing to the absorber.

Coils 36 and 45 form a solution heat exchanger between the entire quantity of relatively hot strong solution passing from the generator to the absorber and the entire quantity of relatively cool weak solution passing from the absorber to the generator. Also, the entire quantity of vapor passing to the absorber is in heat exchange relation with the entire quantity of weak solution passing to the generator. The amount of heat transfer surface provided between the strong and weak solution is designed so that the weak solution is brought to just about its boiling point so that vapor is not formed in the solution heat exchanger. Formation of vapor in the solution heat exchanger is undesirable because it results in flow of vapor in the solution circuit in a direction opposite that which provides best thermodynamic efficiency with minimum heat transfer surface. In accordance with this invention, heat from the strong solution is utilized to boil weak solution in the generator reservoir, rather than in the heat exchanger, which is a thermodynamically more advantageous location and results in a flow of vapor through the analyzer and rectifier concurrently with the strong solution.

The weak solution from line 32 passes through coil 36 in the annular space between inner heat exchange coil 45 and outer heat exchange coil 36 where the weak solution is heated to substantially its boiling point by heat exchange with strong solution. After passing through coil 36, the heated weak solution is discharged from opening 37 onto one of a plurality of baffles or plates 39, in analyzer column 38.

Analyzer 38 comprises a tubular member having a plurality of plates 39 which provide surfaces for contact of vapor with the reflux and the solution which wets the surfaces of the plates. The weak solution passes successively over the plurality of plates and is discharged from the bottom of the analyzer into a generator reservoir 40. Generator reservoir 40 provides solution storage for part load operation conditions and allows for solution and refrigerant charging tolerance, and compensates for manufacturing variations in machine volume.

Preferably, rectifier-heat exchanger section 35, analyzer 38, and generator reservoir 40 are formed into a single vessel, as shown in FIGURE 1, for ease of manufacturing and to eliminate piping costs. It will be appreciated, however, that the portions of this vessel may be separated if desired, and need not necessarily be located in the positions relative to one another shown in the drawing. For example, the generator reservoir could be located at a higher elevation and the analyzer could be of the flooded type.

Weak solution from generator reservoir 40 passes through line 49 into generator coil 50. The solution in coil 50 is heated by suitable means such as gas burner 51 causing the solution to boil thereby forming vapor. The vapor and hot solution is discharged from coil 50 into separation chamber 53, formed by a baffle or weir 52, where the vapor separates from the remaining strong solution. Preferably, some of the solution normally spills over the top of baffle 52 and is recirculated through line 49 to generator coil 50. It will be understood that the solution in separation chamber 53 has been concentrated by vaporizing refrigerant therefrom in generator 15.

Vapor formed in generator 13 passes concurrently with strong solution through the vapor passage 55 formed in the upper portion of generator reservoir 40, through analyzer 38, and through the vapor passage formed by shell 46 of rectifier 35 to condenser 11.

The concentrated or strong absorbent solution from separation region 53 is at the relatively high generator pressure and passes through heat exchange coil 48 in generator reservoir 40, heat exchange coil 47 in the analyzer column, and inner heat exchange coil 45 in the rectifier. The strong solution then passes through line 60 and restriction 61 into line 29 and absorber 10 on the relatively low pressure side of the system.

Heat from the strong solution passing through coil 48 boils the weak solution in the generator reservoir to vaporize refrigerant therefrom. The heat exchange which takes place in the generator reservoir results in cooling the strong solution flowing through coil 48 so that it enters the analyzer and rectifier respectively at the best temperature to achieve maximum efficiency with minimum heat transfer surface. It is undesirable to form vapor in the solution heat exchanger but forming vapor in the generator reservoir results in a significant improvement in the over-all efficiency. Thus, heat which could not be effectively utilized in the heat exchanger is utilized to boil refrigerant from solution in the reservoir.

A portion of coil 48 is submerged below the level of weak solution in reservoir 40 and another portion of the coil is disposed in the vapor passage above the weak solution. The boiling of the weak solution causes the portion of coil 48 which is disposed in vapor passage 55 to be wetted with solution. As the strong solution passes through coil 48, it becomes progressively cooler. Vapor formed in the generator and in the reservoir passes through the vapor passage 55 and contacts the exposed wetted portion of coil 48 in reservoir 40, and mass and heat transfer take place with the weak solution boiling in the reservoir. It will be appreciated that ammonia vapor will be boiled from the weak solution in the reservoir and that water vapor will be condensed from the vapor space into the weak solution in proportions resulting in an enrichment of the refrigerant content of the vapor passing through the reservoir. Also, the condensation of water vapor into the weak solution will liberate additional heat which assists in vaporizing the solution.

Similarly, as the vapor passes from the reservoir upwardly through analyzer column 38, a mass and heat transfer takes place between the weak solution passing downwardly over plates 39 in the column and further enriches the refrigerant content of the vapor.

The vapor then passes through rectifier 35 where it is placed in heat exchange relation with the weak solution passing through coil 36. The heat transfer which takes place in the rectifier results in condensing additional water from the vapor which then leaves the rectifier in a highly purified or enriched state.

The purified refrigerant vapor passes from rectifier 35 through line 58 into the coil of condenser 11. Fan 15 passes air over condenser 11 causing the refrigerant vapor to condense. The condensed refrigerant passes through line 23 and restriction 24 into evaporator 12, as previously explained.

As the vapor passes through rectifier 35, the reflux or solution which is condensed flows by gravity to analyzer 38 and passes downwardly through the analyzer column along with weak solution discharged from outlet 37 of coil 36. This rectifier condensate is heated along with weak solution in the analyzer to produce additional vapor by heat exchange with the strong solution passing through coil 47. By utilizing the heat of the strong solution after it has passed through the generator reservoir 40 but prior to its passage to the solution heat exchanger 36, 45 a gain in cycle efficiency is achieved with minimum overall heat transfer surface requirements. Consequently, a gain in efficiency is realized by vaporization of ammonia from the rectifier condensate during its passage in heat exchange relation with coil 47. Furthermore, coil 47 adds additional contact surface in analyzer 38 and improves its effectiveness.

Referring particularly to FIGURE 2, there is shown therein a modified embodiment of this invention wherein rectifier 35 is fabricated as a separate vessel from analyzer column 38 and generator reservoir 40. Rectifier 35 comprises shell 146 within which is disposed solution heat exchanger 36, 45. In this embodiment shell 146 comprises a separate vessel which is disposed partially below the level at the top of analyzer column 38 to conserve height as can be seen from the drawing. Passage means 137 is provided to admit vapor from analyzer 38 to rectifier 35. Many of the parts of this figure, including combined heat exchanger and rectifier 35, need not be described in detail because corresponding parts, which have been described with respect to the previous embodiment of the invention, have been designated with similar reference numerals.

The arrangement shown in FIGURE 2 adds slightly to the complexity of the system but is particularly advantageous where it is desired to reduce the total height of the absorption refrigeration machine by locating rectifier 35 at the same level as the top of analyzer column 38. In this arrangement, the reflux or condensate formed in the combination rectifier and heat exchanger cannot drain into the top of the analyzer column by gravity, as in the preceding embodiment. While this condensate could be injected into the analyzer column at the level of the lower plates therein, some system efficiency would be lost. In order to overcome this problem, a separate rectifier condensate heat exchanger 141 is employed. Strong solution from coil 48 is passed through a heat exchange coil 147 in rectifier condensate heat exchanger 141. The strong solution passes from coil 147 into inner coil 45 of rectifier 35. Condensate from rectifier 35 passes through line 140 into heat exchanger 141. Ammonia vapor is boiled from the rectifier condensate in heat exchanger 141 by the heat imparted to the condensate from strong solution passing through coil 147 similarly to the preceding embodiment. The condensate then passes through trap 142 into the bottom of generator reservoir 40 and the ammonia vapor passes through rectifier 35 and line 58 to condenser 11.

It will be seen that by the use of this invention, substantially the entire quantity of weak solution passing from the absorber to the generator is simultaneously placed in heat exchange relation with the entire quantity of strong solution passing from the generator to the absorber and substantially the entire quantity of vapor passing to the condenser. Furthermore, the strong solution and refrigerant vapor flow concurrently with each other through the rectifier and heat exchanger and in counterflow relation with the weak solution. This arrangement leads to minimum heat exchange surface and maximum thermodynamic efficiency. Important, also, is that the arrangement described results in a particularly simple physical arrangement which is relatively inexpensive to manufacture because it requires a minimum of pipes and connections. Also, the volume occupied by the machine may be somewhat reduced by incorporating the heat exchanger within the rectifier and its appearance is improved.

While the preferred embodiments of this invention have been described for purposes of illustration, it will be appreciated that this invention may otherwise be embodied within the scope of the following claims.

I claim:
1. An absorption refrigeration system comprising:
(A) an absorber for absorbing refrigerant vapor;
(B) an evaporator for evaporating refrigerant and providing a cooling effect;
(C) a generator for concentrating weak absorbent solution by vaporizing refrigerant therefrom;
(D) a condenser for condensing refrigerant vaporized in said generator;
(E) a combined rectifier and heat exchanger comprising:
   (1) first passage means connected to pass vapor formed in said generator to said condenser;
   (2) second passage means connected to pass weak absorbent solution from said absorber to said generator;
   (3) third passage means connected to pass strong solution from said generator to said absorber;
   (4) said first, second, and third passage means being physically disposed with respect to each other so that the weak solution passing through said second passage means is in simultaneous heat transfer relation with both the vapor passing through said first passage means and the strong solution passing through said third passage means;
(F) an analyzer having surface therein for passing vapor and liquid in mass and heat transfer relation with each other;
(G) means for passing vapor from said generator to said first passage of said combined rectifier and heat exchanger through said analyzer in mass and heat transfer relation with weak solution passing through said analyzer from said second passage in said combined rectifier and heat exchanger to said generator; and
(H) means for passing condensate formed in the first passage of said combined rectifier and heat exchanger to said generator in heat exchange relation with strong absorbent solution passing from said generator to said third passage in said combined rectifier and heat exchanger, and means to pass vapor liberated from said rectifier condensate to said first passage of said combined rectifier and heat exchanger.

2. An absorption refrigeration system comprising:
(A) an absorber for absorbing refrigerant vapor;
(B) an evaporator for evaporating refrigerant and providing a cooling effect;
(C) a generator for concentrating weak absorbent solution by vaporizing refrigerant therefrom;
(D) a condenser for condensing refrigerant vaporized in said generator;
(E) a combined rectifier and heat exchanger comprising:

(1) a cylindrical shell member connected to pass vapor from said generator to said condenser,
(2) a first hollow, helically coiled, tubular heat exchange coil connected to pass strong solution from said generator to said absorber,
(3) a second hollow, helically coiled, tubular heat exchange coil disposed concentrically about the exterior of said first heat exchange coil in spaced relation with the exterior wall of said first heat exchange coil to form an annular passage connected to pass weak solution from said absorber to said generator in simultaneous heat exchange relation with both said vapor passing to said condenser and said strong solution passing to said absorber;
(F) an analyzer having surface therein for passing vapor and liquid in mass and heat transfer relation with each other, and a heat exchange liquid passage disposed in said analyzer;
(G) means for passing vapor from said generator to said first passage of said combined rectifier and heat exchanger through said analyzer in mass and heat transfer relation with weak solution passing through said analyzer from said second passage in said combined rectifier and heat exchanger to said generator; and
(H) means for passing condensate formed in the first passage of said combined rectifier and heat exchanger through said analyzer to said generator in heat exchange relation with strong absorbent solution passing through said heat exchanger liquid passage in said analyzer from said generator to said third passage in said combined rectifier and heat exchanger, and means to pass vapor liberated from said rectifier condensate to said first passage of said combined rectifier and heat exchanger.

References Cited by the Examiner

UNITED STATES PATENTS

| | | | |
|---|---|---|---|
| 2,191,551 | 2/1940 | Ullstrand | 62—496 X |
| 2,241,621 | 5/1941 | Shoeld | 62—495 X |
| 2,295,064 | 9/1942 | Ullstrand | 62—495 X |
| 3,038,320 | 6/1962 | English et al. | 62—495 X |

LLOYD L. KING, *Primary Examiner.*